Oct. 1, 1968         A. J. SEVENCO         3,404,329
MAGNETIC AMPLIFIER CONTROLLED POWER SUPPLY REGULATORS
Filed April 7, 1966                    4 Sheets-Sheet 1

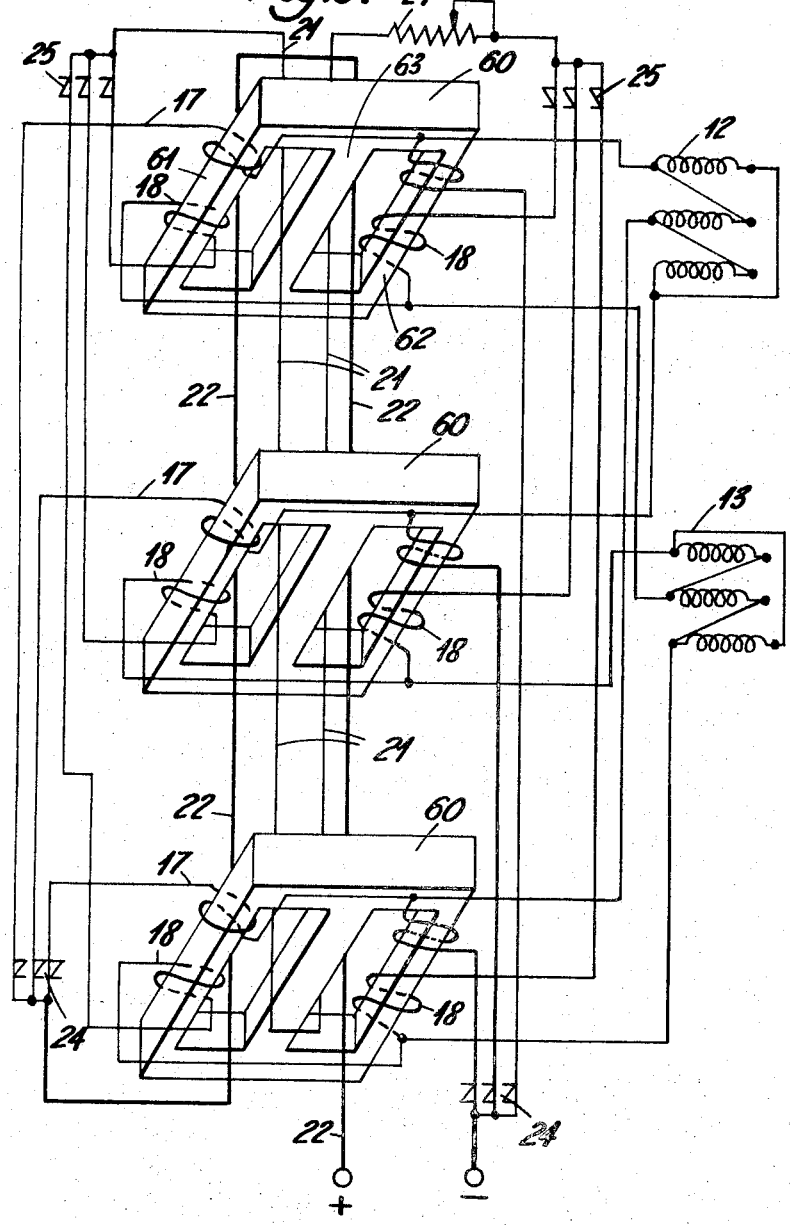

United States Patent Office 3,404,329
Patented Oct. 1, 1968

3,404,329
MAGNETIC AMPLIFIER CONTROLLED POWER
SUPPLY REGULATORS
Alexander Jura Sevenco, Burlington, Ontario, Canada,
assignor to Lincoln Electric Company Limited, Hertfordshire, England, a British company
Filed Apr. 7, 1966, Ser. No. 540,952
Claims priority, application Great Britain, Apr. 15, 1965,
16,342/65
17 Claims. (Cl. 321—19)

ABSTRACT OF THE DISCLOSURE

A magnetic flux reset transductor for regulating the characteristics of both the current and voltage provided to a load, comprises at least one pair of magnetic elements, each magnetic element including a main winding and a reset winding wherein the main winding and the reset winding are simultaneously energized from alternate half cycles of current from an alternating current source such that the change in flux density in the cores of the magnetic elements will occur within the half cycle of the alternating current in which current flows through the reset windings. A main feedback winding on each of the magnetic elements, energized by a signal representing the load current, provides a means for controlling the characteristics of the voltage and currents applied to the load. A secondary feedback winding, energized by a signal representing the combined current in the reset windings, may be provided to furnish additional feedback control.

---

This invention relates to electrical control apparatus and more particularly to apparatus wherein heavy electric currents are controlled by magnetic flux operated units such as saturable reactors.

It is often desirable that an electrical control circuit for controlling heavy currents should, in addition to having a particular output characteristic (such as for example, a constant output voltage with increasing load current) respond rapidly to a change in load conditions. One example of a control circuit which should respond rapidly to a change in load to maintain a constant output would be a speed controller for an alternating current or direct current motor which drives a rolling mill or which is used for traction at a constant speed independently of output torque or voltage drop due to armature current. Another typical example is provided by control apparatus for electric arc welding, where it may be necessary to supply the main welding circuit with a constant voltage in conditions where the resistance of the welding circuit is changing.

This invention would find particular application as a power source for a welding process in which an electrode is repetitively moved to contact a work piece or weld pool, thereby creating a short circuit which melts the end of the electrode to form a molten droplet which is transferred to the work piece or weld pool, after which an arc is formed between the electrode and work or weld pool, which arc continues until the next period of short circuit. In order to control, for example, the appearance of the weld it is often necessary to control the characteristics of the output from the source supplying power to the welding circuit and at the same time the source has to be capable of responding quickly to a change in, for example, arc length so that, for example, a long duration, constant power pulse of current may be supplied to the welding circuit.

Hitherto, one of the main difficulties in achieving a rapid response to a change in the condition of a control circuit has been the slow response of closed loop control windings in, for example, magnetic amplifiers or over compounded generators. Such devices possess large inductance and which at the same time must pass a large current, since, in control apparatus of this kind, it is usual to control an output characteristic by developing an error signal by comparing a constant potential reference with a substantial feed-back portion of the output. The present invention is directed to an improved form of control apparatus which may achieve a faster response to changing conditions than known apparatus, yet utilizes the desirable features of magnetic flux controlled circuits.

According to this invention, in electrical control apparatus there are provided at least one pair of magnetic transductors, each transductor having a first winding (hereinafter referred to as "the main winding") and a second winding (hereinafter referred to as "the reset winding"). The main windings of each pair of transductors are arranged to be alternately supplied with half cycles of current from a source of alternating current and are connected to a common load and, the reset winding of each transductor is supplied with half cycles of current when the main winding of the other transductor of the same pair is being supplied with current. A feedback circuit (hereinafter referred to as the main feedback winding) is energised by a signal representing the current in the load and arranged to produce magnetic flux in the same direction in all the transductor cores. There may conveniently be a second feedback circuit (hereinafter referred to as the secondary feedback winding), energised by a signal representing the reset combined currents in the reset windings and arranged to produce magnetic flux in the same direction in all the transductor cores.

This invention makes use of flux reset transductors, that is to say, transductors in which the main winding and reset winding on a transductor core are energised from alternate half cycles of the source waveform, so that a change in flux density in the core produced by a change in the current through the reset winding is not delayed by flux linkage with those turns caused by current flowing in the main winding. Consequently, the change in flux density will occur within the half cycle of the supply frequency in which current flows through the reset winding. This change in reset current will control the main winding current during the following half cycle independent of the reset winding inductance. This rapid response (that is, a change made to occur within half a cycle of the source frequency) will occur even if the flux density level in the core is changed from one extreme saturation value to the other, provided that no electrical control closed loops or short circuited turns exist on the core tending to delay the response appreciably. For the regulation of the output voltage versus current characteristic however, feedback from at least the main winding has to be applied to the core, and with the present invention, the effect of a large inductance in a control circuit is avoided since the main feedback winding, which would carry an appreciable current, need only have a single turn on the core and would therefore possess negligible inductance. Likewise the reset feedback winding, which would have a greater number of turns, need pass only a very small current because it is not connected with the load circuit and the effect of the increased inductance is insignificant, as reset current and reset feedback winding currents are independent of main windings and circuit inductance.

In the present invention, a single feedback winding couples all the transductor cores. If each transductor were to have separate feedback windings energised from the currents in the respective main windings a change in, for example, load current would not be communicated within the same half cycle to the feedback windings of the other cores. The application of feedback via a single winding in the same direction to all the cores ensures that the necessary change in flux level in all the cores is effected within the same half cycle of the source waveform.

Each pair of cores may be energised from one phase of a polyphase alternating current source. For many purposes, a direct current output may have to be provided (as in, for example, inert gas-shielded arc welding) and the combination of the outputs from pairs of transductors connected to different phases of the source is preferable to lessen the ripple content of the direct current output.

The main windings and reset windings are preferably provided with series rectifiers so that a direct current signal may be fed back through the respective feedback windings. In control apparatus of the kind that has been described, control of an output characteristic is achieved by controlling the resultant flux density in the transductor cores produced by the feedback windings.

In order to compare signals derived from the main and reset windings, which are supplied in anti-phase, the signals must be rectified. It is however, not necessary that the combined output from the main windings be unidirectional. If, for example, a direct current output is desired, pairs of main windings which are fed in anti-phase may be connected to opposite terminals of the load. If, however, an alternating current output is desired, pairs of main windings which are supplied in anti-phase may be connected to the same load terminal. In the latter arrangement, one of each pair of main windings would supply a half cycle of rectified current in one direction alternately with a half cycle of rectified current in the other direction supplied from the other winding, the resultant effect being that of alternating current at the frequency of the source. In either of the above arrangements, a choke may be provided in the load circuit so that ripple in the output waveform may be reduced.

In one embodiment, the main feedback winding is preferably arranged to oppose the reset windings whereas the reset feedback windings may assist the reset windings. When no load current flows, the open circuit output voltage would depend on the flux density in the cores prodced by a conventional low power control winding, known as the bias winding. With increasing load current however, flux density in the cores will decrease, thereby decreasing the impedance of the cores with respect to the feedback circuit. A greater current would flow in the reset feedback winding, reducing the effect of the main feedback winding. Means, such as a variable resistor, may therefore be provided to vary the current through the reset feedback winding so that, as this current is decreased, the slope of the output voltage versus current characteristic is increased.

In an alternative arrangement, the main feedback winding may assist the reset winding whereas the reset feedback winding may oppose the reset winding. With this arrangement, an increase in load current will increase the impedance of the cores so that a decrease in output voltage is achieved. Such a "drooping" characteristic would find particular application in a submerged arc flux welding process.

In a further alternative arrangement, the reset feedback winding may be open circuited, and means provided for limiting the flow of current through the reset winding. The main feedback winding is then arranged to assist the reset windings. With this arrangement, as the load current becomes large compared with the bias current, the flux density in the cores will be determined by the flow of current through the main feedback windings and the impedance of the cores will remain substantially constant over a large range of main winding current. The constant nature of the output voltage versus current characteristic with increasing current makes such an arrangement particularly suitable in a hand welding process, in which it is usually desirable that the welding current remains constant even with varying arc length and hence arc voltage.

A further short circuited winding may be arranged to couple all the cores. Such a winding would delay the response of the transductors and by varying the resistance of the winding a variable delay in the transient response of the apparatus may be provided.

Some examples of the invention will now be described with reference to the accompanying drawings in which:

FIGURE 6 shows three transductor cores showing the way in which the windings are placed on the cores.

Figure 1:
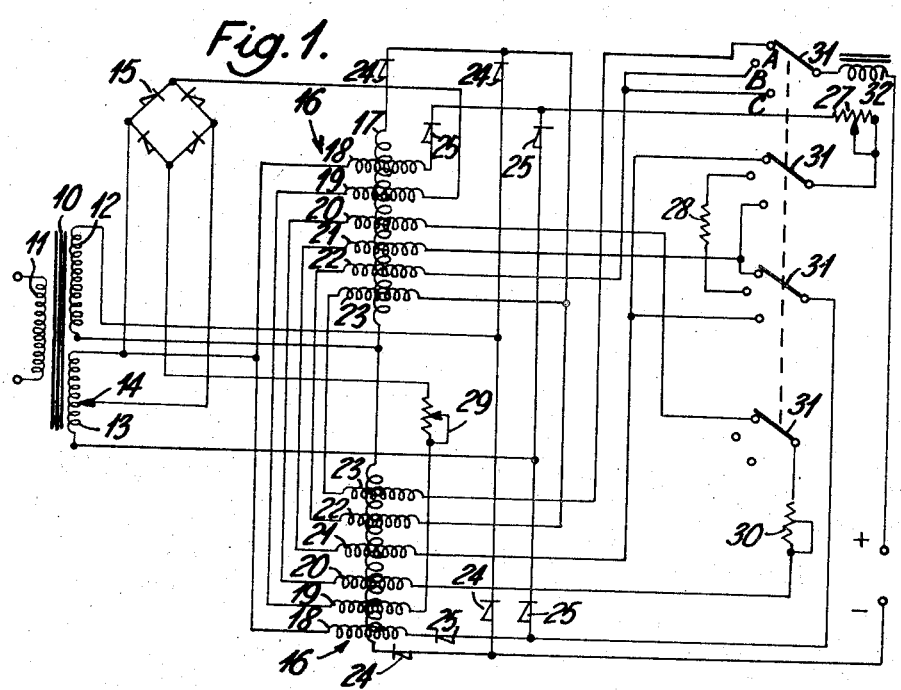
FIGURE 1 shows diagrammatically a single-phase control circuit.

In the following description of FIGURES 1 to 5 the windings on the transductor cores are shown diagrammatically and do not, for the sake of simplicity, indicate the correct magnetic phasing of the windings. In FIGURE 1 the supply of current is obtained from the transformer 10 having primary windings 11 connected to an alternating current source and a main secondary winding 12 which supplies a current for the main circuits of the transductor. A further secondary winding 13 is tapped at 14 so as to supply current for the rectifying bridge 15 to supply D.C. control current for the bias windings 19 for each transductor. Two halfwave transductors 16 each have a magnetic core (not shown) on which is wound a load winding 17, the two windings 17 being connected in series and connected across the secondary winding 12 of the transformer 10. Each core has a reset winding 18, the windings 18 being likewise in series and supplied with current from the winding 13 on the transformer 10 in anti-phase with the supply to the main windings 17. The bias windings 19 of the two transductors are connected in series and supplied as mentioned above from the rectifier 15, the bias current being varied by the variable resistor 29. The cores have, in addition, delay windings 20 connected in series, the magnitude of the current through the delay windings being controlled by the setting of the variable resistor 30. The four ganged switches 31 have three positions A, B and C: position A allowing feedback through the windings 21 and 23 from the reset and main windings respectively; position B allowing current to flow through the feedback windings 22 supplied from the main windings; and position C allowing the main feedback windings 22 and the reset feedback windings 21 to be supplied with current from the main windings and the reset windings, respectively. The rectifiers 24 and 25 in the main winding circuits and reset winding circuits are provided to yield a direct current output as in conventional magnetic amplifier practice.

Figure 2:
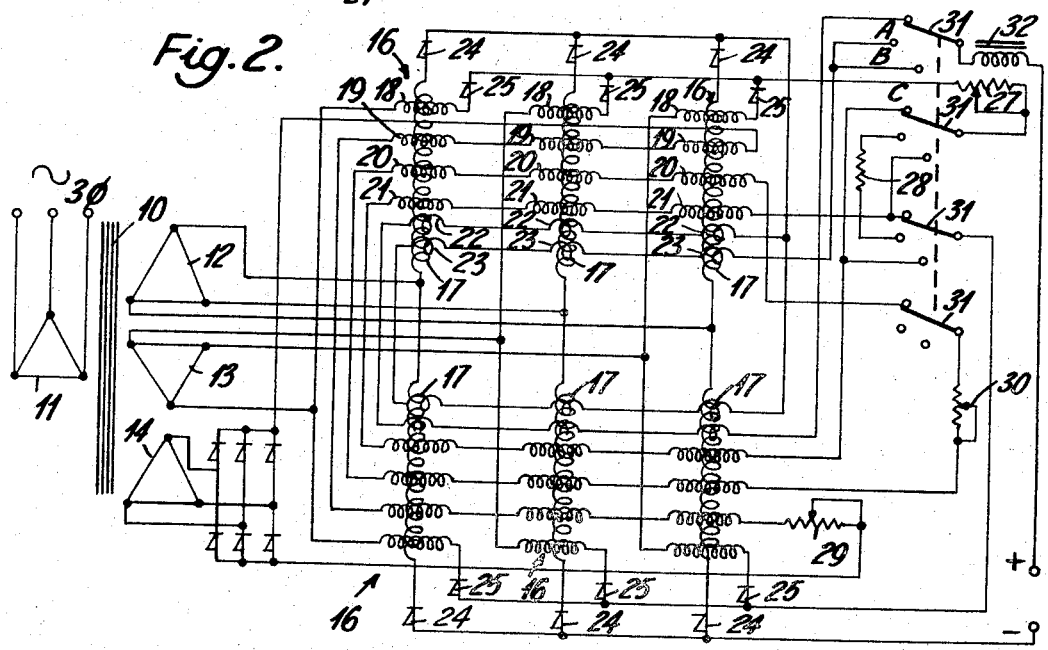
FIGURE 2 shows diagrammatically a three-phase control circuit.
Figure 3A:
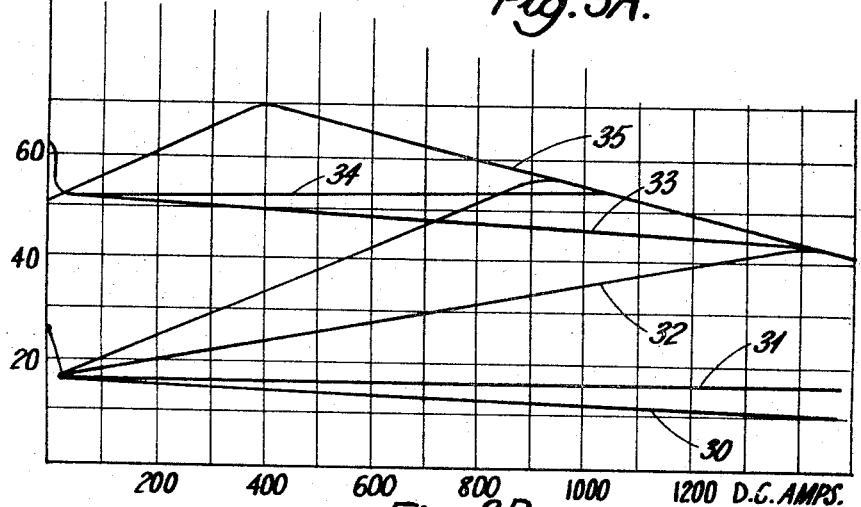
FIGURES 3A and 3B show the voltage/current characteristics which may be obtained from the circuit of FIGURE 2.

In FIGURE 2 is shown a similar circuit in which the single phase supply has been replaced by a three-phase supply, each transductor 16 having a main winding supplied from one of the phases of the supply and its reset winding fed from the anti-phase connection on the other secondary winding of the three-phase transformer 10. The operations of the circuits in FIGURE 1 and FIGURE 2 are similar, and will only, for simplicity, be described with reference to FIGURE 2. With the switch 31 in position A the feedback windings 22 and 21 are supplied with current, since they are connected in the rectified output of the main windings and reset windings. The flux density produced in the cores by the bias and reset windings 19 and 18 determine the initial magnetic flux density in the transductor core and hence the initial volts drop across the main windings 17 and thus the D.C. voltage produced at the output on open circuit. As the bias ampere turns predominate the magnetic flux density is reduced and the D.C. output volts are increased. Control of the biased windings 19 by the variable resistor 29 will therefore determine the initial open circuit voltage. The ampere turns in main feedback windings 22 oppose those produced by the reset windings 18, whereas the reset feedback windings 21 ampere turns assist those produced by the reset windings 18. On load the resultant magnetomotive force will control the magnetic density of the cores and consequently the output voltage. With increasing load current the ampere turns in the main feedback windings 22 will increase and the flux density in the core will decrease in proportion to the ratio of the ampere turns produced by the feedback windings 22 and the reset windings 18, respectively. The impedance in the reset winding circuit will decrease and more current will flow in the reset feedback winding 21, which will tend to reduce the net effect of the main feedback windings 22. Depending on the current flowing through the reset windings 21 the slope of the static voltage output current curve, as shown in FIGURE 3A, can be controlled. As the reset current variable resistor 27 is varied, for example sixteen volts direct current which would represent a light load (twenty-five volts being the open circuit setting), as the reset current is gradually decreased by this resistor the slope, as can be seen from FIGURE 3, moves from the slightly drooping curve 30 to the flat curve 31 to the slightly rising curve 32. The same remarks also apply at the upper voltage position as shown by the curve 33, 34 and 35 respectively.

Figure 4:
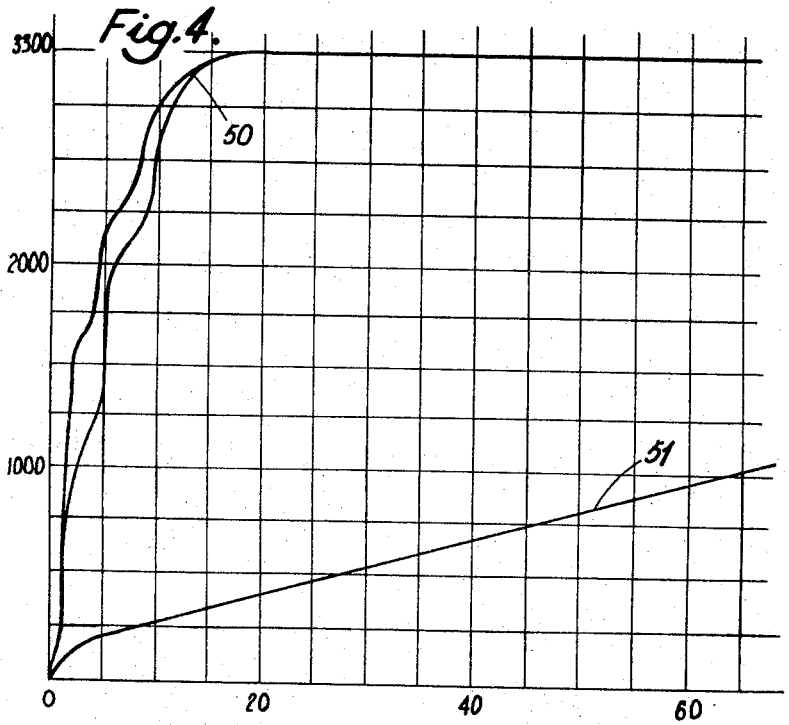
FIGURE 4 shows the dynamic characteristics which may be obtained from the circuit of FIGURE 2.

With the changing output direct current load the response of the equipment is illustrated in FIGURE 4 and the delay windings 20 will act as an inductance delay due to the effect of equivalent short circuited turns round the magnetic cores of the transducers 16 and thus the response or rate of curent rise can be controlled, as shown by the curves 50 and 51 in FIGURE 4, independently of the voltage applied or the other controls in circuit. The delay is varied by the variable resistor 30, which, when decreased, progressively increases the delay time. A faster rate of current rise and response than conventional power sources is available while at the same time different selected direct current voltages are available. Irrespective of the voltage selected, the ultimate value of this voltage will be that corresponding to the maximum voltage available from the power source. This occurs since the magneto-motive force produced by the feedback winding 22 will predominate and saturate the cores within half a cycle of the supply waveform and thus full output will be achieved in the following half cycle.

With the switch 31 in position B, the reset feedback windings 21 are taken out of circuit and a reset current limiting resistor 28 is substituted. Also, the main feedback windings 23 are brought into circuit in place of the windings in 22, the ampere turns produced assisting those of the reset windings 18.

Figure 3B:
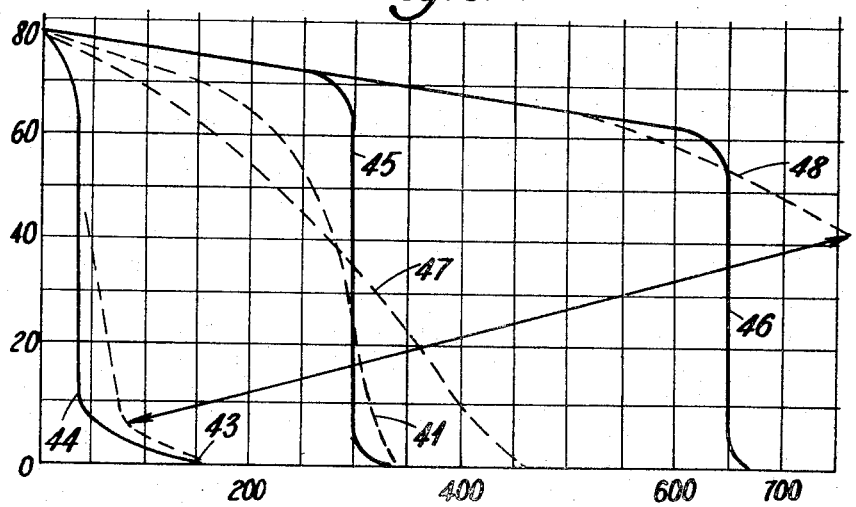

Since the ampere turns predominating on open circuit are those produced by the bias windings 19 the maximum obtainable voltage from the power source can be obtained as shown in FIGURE 3. As the current increases, the resultant ampere turns in the feedback winding 23 and the bias windings 19 will determine the shape of the static voltage output current until a certain current is reached at which the flux density in the cores will be substantially determined by the ampere turns produced by the feedback windings 23. The static voltage current curve will have a constant current nature at the value of curent perselected by the bias windings 19. This will continue for decreasing load impedance until nearly short circuit conditions are reached. Under this condition the transductors 17 are dropping the maximum voltage possible and will lose control of the D.C. output current which will be allowed to increase or be boosted to a higher value as shown by point 43 on curve 44 of FIGURE 3B. This boosting is particularly beneficial for the type of welding process and electrode requiring these characteristics especially at the low current ranges. Increasing the bias current by resistor 29 will reduce the effectiveness of feedback winding 23, thus allowing high current ranges to be obtained in the same mode of operation as described and shown by curves 45 and 46 of FIGURE 3b.

With the switch 31 in position C the reset feedback winding 21 is brought back into the circuit, so that it now opposes the effect of the reset winding 18 and the feedback winding 23. This has the effect of giving a more drooping rather than a constant current characteristic as shown by curves 47 and 48 of FIGURE 3B, with the bias resistor 29 still controlling the range of D.C. current. The variation of the reset resistor 27 will thus give a controlled drop characteristic for the same bias ampere turns, so that with less current flowing in the reset feedback winding 21, the curve 41 will now be the same as curve 47.

For simplicity, the correct amounts of resistance put in each of the circuits by the other contact on switch 31 to give the required range of current values have not been shown in the figures.

The smoothing choke 32 is included in the circuit so as to reduce the ripple in order that a better weld appearance is achieved and arc extinction is eliminated.

Figure 5:
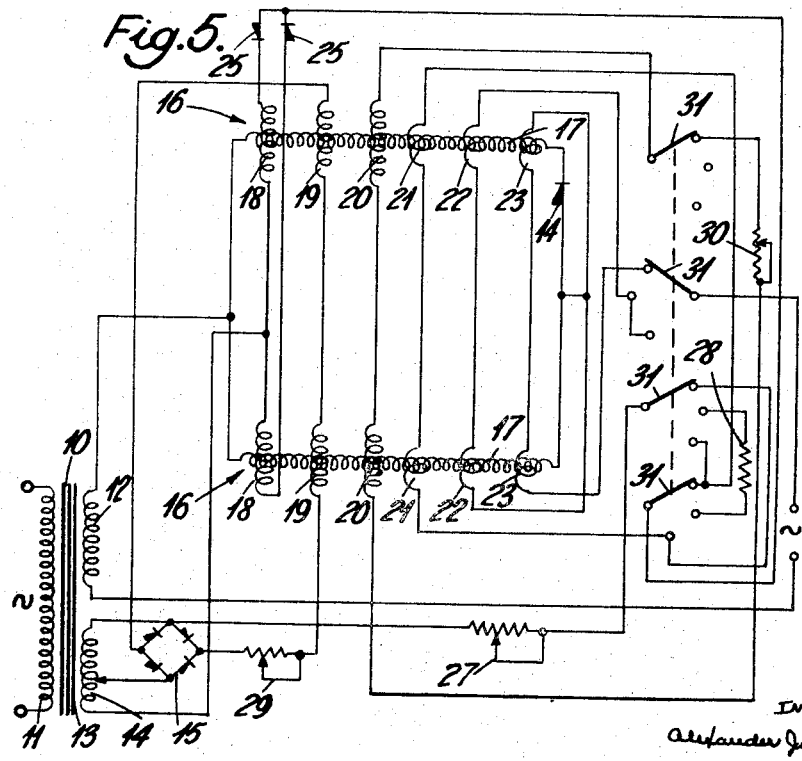
FIGURE 5 shows diagrammatically a single-phase circuit arranged to produce an alternating current output.

FIGURE 5 shows diagrammatically a single phase connected circuit which operates in the same way as that shown in FIGURES 1 and 2, except that the controlled output is now A.C. and not D.C. This is achieved by having the main windings of two transductors connected in anti-phase so that their outputs may be combined as in the familiar push-pull stages of valve or transistor amplifiers. The rectifiers 24 are now used for auto-excitation only and not for rectifying the A.C. output. The reset rectifiers 25 are also used for the same purpose, that is to say, they limit the current flow through each reset winding in one direction only. The other component of the circuit are arranged as has been described with reference to FIGURE 1.

In FIGURE 6 are shown three transductor assemblies one for each pase of a three-phase supply having windings connected in accordance with the invention. Each transductor assembly has the equivalent of two cores such, that for a three-phase supply, six transductors are in fact used, as in FIGURE 2. Each transductor assembly comprises a core 60 having a main winding 17 wound successively on the two outer limbs 61, 62 in opposite senses so that the combined effects of the two windings do not affect the flux density in the central limb 63, thereby not affecting the current in the low power bias winding which would be wound on the central limb 63. The reset windings are likewise disposed on each core. Between corresponding limbs 62, 63 of each core successively pass the two feedback windings 18, which are arranged to produce flux in the central limb of each core by also passing in the opposite direction between the limbs 61, 63, respectively.

I claim:
1. Magnetic transductor controlled power supply regulators for providing controlled voltage and current to a load, comprising:
   at least one pair of magnetic transductor elements, each transductor element including a core and a main winding and a reset winding and bias winding wound on the core, the bias windings are connected to a source of D.C. current to provide an initial state of flux in the transductor cores,
   the main windings of each pair of magnetic transductor elements are serially connected to each other across a source of alternating current such that each main winding of each pair of magnetic transductor elements is alternately supplied with half cycles of current,
   the reset windings of each pair of magnetic transductor elements being serially connected to another source of alternating current such that the reset winding of one transductor element of each pair of magnetic transductor elements is supplied with current when the main winding of the other transductor element of the same pair is being supplied with current, each transductor element further including a main feedback winding, the main feedback windings of each pair of magnetic transductor elements being serially connected to each other and connected to the load to be energized with a signal representing the current in the load and wherein the main feedback windings are wound to produce magnetic flux in the same direction in the transductor cores.

2. A magnetic transductor controlled power supply regulator according to claim 1 further comprising means for rectifying the current in the main and reset windings to provide a direct current signal in the main feedback and reset windings, and means for providing a variable limiting current through the reset windings.

3. A magnetic transductor controlled power supply regulator according to claim 2 wherein the flux produced in the cores by the main feedback windings aids the flux produced in the cores by the reset windings, and further comprising means for additionally limiting the current in the reset windings.

4. A magnetic transductor controlled power supply regulator according to claim 3 wherein the main windings and the main feedback windings of each pair of transductor elements are connected to opposite terminals of the load to produce a D.C. output current and voltage.

5. A magnetic transductor controlled power supply regulator according to claim 3 wherein the main windings and the main feedback windings of each pair of transductor elements are connected to the same terminal of the load to produce an A.C. output voltage and current.

6. A magnetic transductor controlled power supply regulator according to claim 1 wherein each magnetic transductor element further includes a reset feedback winding and the reset feedback windings of each pair of magnetic transductor elements are serially connected to each other and, wherein the reset feedback windings of each pair of magnetic transductor elements are energized by a signal representing the combined currents of the reset windings in the same pair of transductor elements, and wherein the magnetic flux produced by each pair of reset feedback windings is in the same direction in the cores and opposes the magnetic flux produced in the cores by the main feedback windings and the reset windings.

7. A magnetic transductor controlled power supply regulator according to claim 6 wherein the main windings and the main feedback windings of each pair of transductor elements are connected to opposite terminals of the load to produce a D.C. output current and voltage.

8. A magnetic transductor controlled power supply regulator according to claim 6 wherein the main windings and the main feedback windings of each pair of transductor elements are connected to the same terminal of the load to produce an A.C. output voltage and current.

9. A magnetic transductor controlled power supply regulator according to claim 1 wherein each magnetic transductor element further includes a reset feedback winding and the reset feedback windings of each pair of transductor elements are serially connected to each other, and wherein the reset feedback windings of each pair of magnetic transductor elements are energized by a signal representing the combined currents of the reset windings in the same pair of transductor elements, and wherein the magnetic flux produced in the cores by each pair of main feedback windings is in the same direction and opposes the flux produced in the cores by the reset windings and reset feedback windings of each pair of magnetic transductor elements.

10. A magnetic transductor controlled power supply regulator according to claim 9 wherein each transductor core element further comprises a delay winding and wherein the delay windings of each pair of magnetic transductor elements are serially connected.

11. A magnetic transductor controlled power supply regulator according to claim 10 wherein each pair of magnetic transductor elements further comprises means for limiting the current in the delay windings.

12. A magnetic transductor controlled power supply regulator according to claim 11 wherein the main windings and the main feedback windings of each pair of transductor elements are connected to opposite terminals of the load to produce a D.C. output current and voltage.

13. A magnetic transductor controlled power supply regulator according to claim 11 wherein the main windings and the main feedback windings of each pair of transductor elements are connected to the same terminal of the load to produce an A.C. output voltage and current.

14. A magnetic transductor controlled power supply regulator for providing regulated current and voltage to a load, according to claim 1 wherein each transductor element further comprises a reset feedback winding, delay winding and a secondary feedback winding, and further comprising multi-position switching means for connecting the aforesaid windings in various combinations to provide different control of the current and voltage provided to the load, the switching means including a first position wherein the main feedback windings of each pair of magnetic transductor elements are serially connected to each other between the main windings and the load such that a direct current signal is fed back through the main feedback windings from the main windings and the load, the main feedback winding being wound to produce a flux in the core elements which assists the flux produced by the reset windings, the switching means including a second position wherein the main feedback windings of each pair of transductor elements are serially connected to each other between the main windings of the same pair of transductor elements and the load, and the reset feedback windings of each pair of transductor elements are serially connected to each other and to the reset windings of the same pair of transductor elements, the flux produced in the core by the reset feedback windings assisting the flux produced in the core by the reset windings, the switch means further includes a third position wherein the reset feedback windings of each pair of transductor elements are serially connected to each other and to the reset windings of the same pair of transductor elements, the secondary feedback windings of each pair of transductor elements serially connected to each other and to the main windings of the same pair of transductor elements, the delay windings of each pair of transductor elements are serially interconnected, the flux produced in the core by the secondary feedback windings opposes the flux produced in the core by the main feedback windings.

15. A magnetic transductor controlled power supply regulator according to claim 14 wherein the main windings and the main feedback windings of each pair of transductor elements with the switch means in the first and second positions are connected to opposite terminals of the load to produce a D.C. output current and voltage, and wherein the main windings and secondary feedback windings of each pair of transductor elements with the switch means in the third position are connected to opposite terminals of the load to produce a D.C. output current and voltage.

16. A magnetic transductor controlled power supply regulator according to claim 14 wherein the main windings and the main feedback windings of each pair of transductor elements are connected to the same terminal of the load to produce an A.C. output voltage and current.

17. A magnetic transductor controlled power supply regulator according to claim 14 wherein the main windings and the main feedback windings of each air of transductor elements are connected to the same terminal of the load to produce an A.C. output current and voltage with the switch means in the first and second positions, and wherein the main windings and secondary feedback windings of each pair of transductor elements are connected to the same terminal of the load to produce an A.C. current and voltage with the switch means in the third position.

References Cited

UNITED STATES PATENTS

| | | | |
|---|---|---|---|
| 2,790,127 | 4/1957 | Hamilton | 321—25 X |
| 2,810,876 | 10/1957 | Huge | 321—25 X |
| 3,102,229 | 8/1963 | Darling | 323—89 |
| 3,229,186 | 1/1966 | Lafuze | 321—18 |

MILTON O. HIRSHFIELD, *Primary Examiner.*

WARREN E. RAY, *Assistant Examiner.*